(12) United States Patent
Chen (10) Patent No.: US 9,104,023 B2
(45) Date of Patent: Aug. 11, 2015

(54) CLAMSHELL CAR HEAD-UP DISPLAY DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 160 days.

(21) Appl. No.: 13/939,996

(22) Filed: Jul. 11, 2013

(65) Prior Publication Data

US 2015/0015965 A1   Jan. 15, 2015

(51) Int. Cl.
*G02B 27/01* (2006.01)

(52) U.S. Cl.
CPC .................................. *G02B 27/0149* (2013.01)

(58) Field of Classification Search
CPC .................... G02B 27/0149; G02B 2027/0156
USPC ................................................... 359/630, 632
See application file for complete search history.

(56) References Cited

U.S. PATENT DOCUMENTS

| 5,797,570 A * | 8/1998 | Dolan et al. ............... 248/205.3 |
| 7,886,903 B1 * | 2/2011 | Wurzelbacher et al. ...... 206/320 |

* cited by examiner

*Primary Examiner* — James Greece
(74) *Attorney, Agent, or Firm* — Guice Patents PLLC (57) ABSTRACT

A clamshell car head-up display device includes a body, a display module, a lid, a shaft group and a shaft, the display module is provided to project display information on the reflector plate of the lid, and the shaft group is provided to fix the flip angle of the lid when being lifted, to thereby ensure that the information screen does not be shaken due to car driving.

12 Claims, 11 Drawing Sheets

CLAMSHELL CAR HEAD-UP DISPLAY DEVICE

BACKGROUND OF THE INVENTION

1. Field of the Invention

A clamshell car head-up display device and, more particularly, to a car head-up display device capable to fix the clamshell flip angle, to thereby ensure that the information screen does not be shaken due to car driving.

2. Brief Description of the Related Art

In recent years, many external head-up displays for installing in the car are appeared on the market. The functions of the head-up displays not only display car speed and rotational speed basically, but also water temperature, throttle position, fuel, speed limit warning, reverse image, battery voltage, and even integrate with a speed radar. Some products are emphasized with quick installation, that they only need to be connected to car PC without additional wiring. In luxury cars of some manufacturers, information, such as the navigation system and the front and rear vehicle distances, are also added into the information displayed on the head-up displays, to increase convenience for drivers. The price of commercially available external head-up displays is from several hundred dollars for the simple-functional ones to several ten thousand dollars for the high-quality and multifunctional ones. These commercially available head-up displays are used to project the required displayed information on car windshields directly. However, the specifications of car windshields are different, and also, the surface of a windshield may be scratched by crushed stones and many little concave points may be produced under long-term driving with high speed. Irregular little refractions may be formed due to these little concave points, especially when sun light shines on the windshield, and viewing the screen information may be affected if the distribution of the concave points is too dense. Therefore, how to provide a high-definition reflective screen is a desire of the industry.

Figure 1:
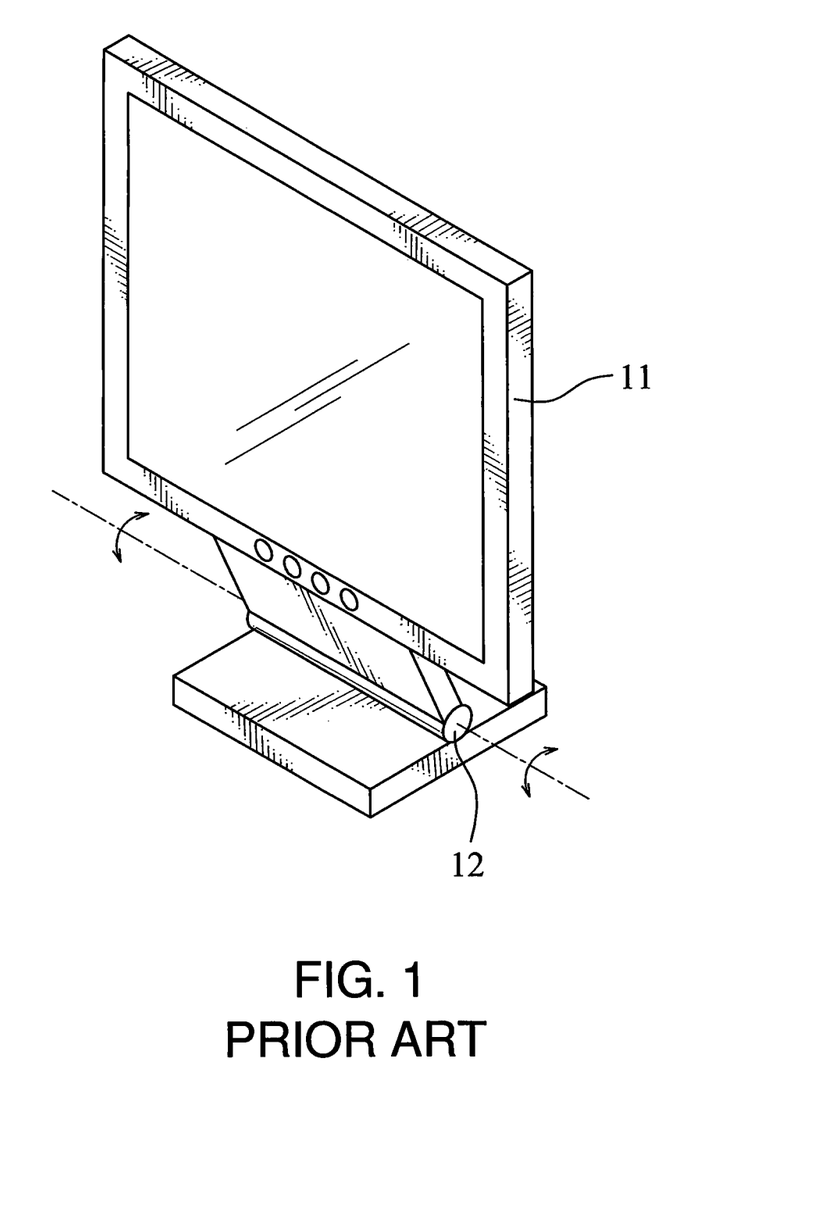
FIG. 1 is a schematic diagram of a conventional structure.
Figure 2:
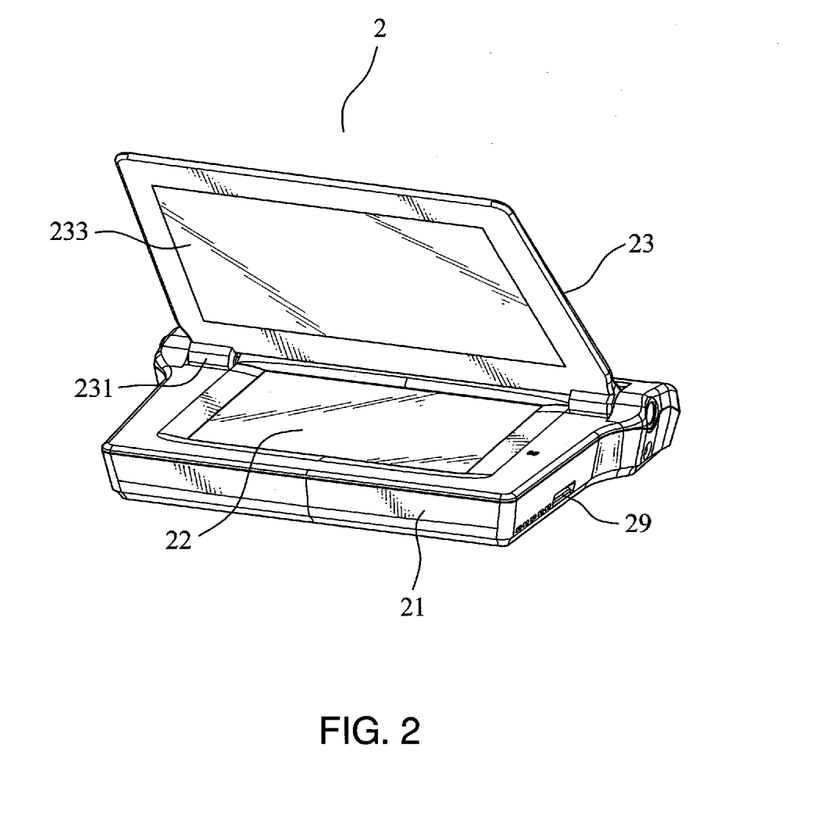
FIG. 2 is a schematic diagram of the lifted lid of the present invention.
Figure 3:
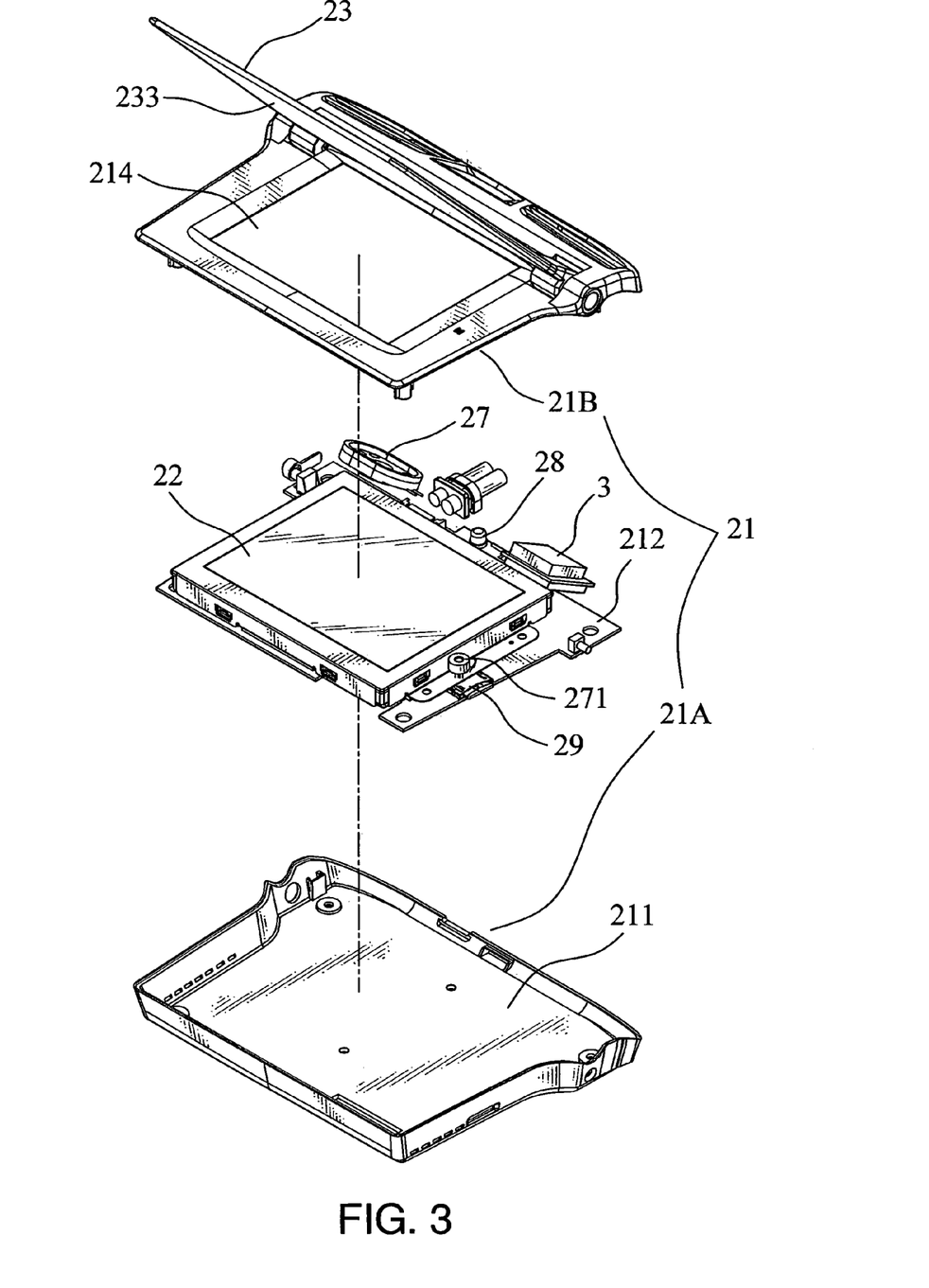
FIG. 3 is a three-dimensional exploded diagram (1) of the present invention.
Figure 4:
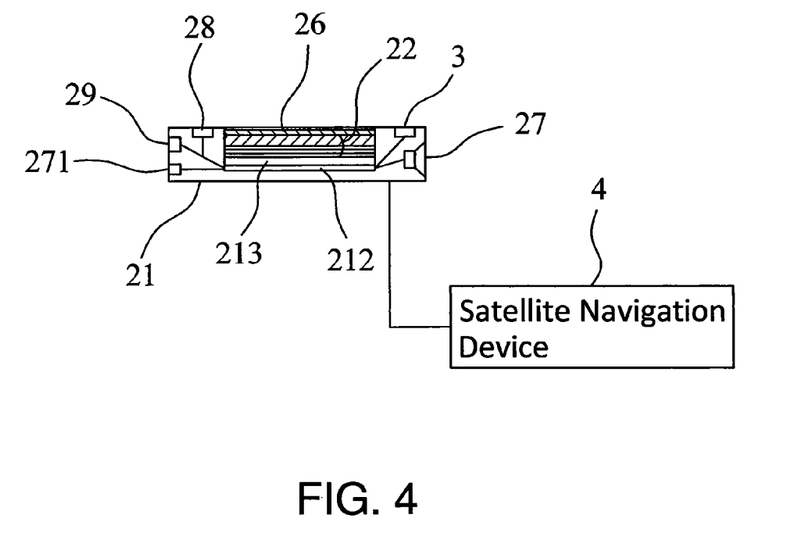
FIG. 4 is a schematic diagram of the structure of the body of the present invention.
Figure 5:
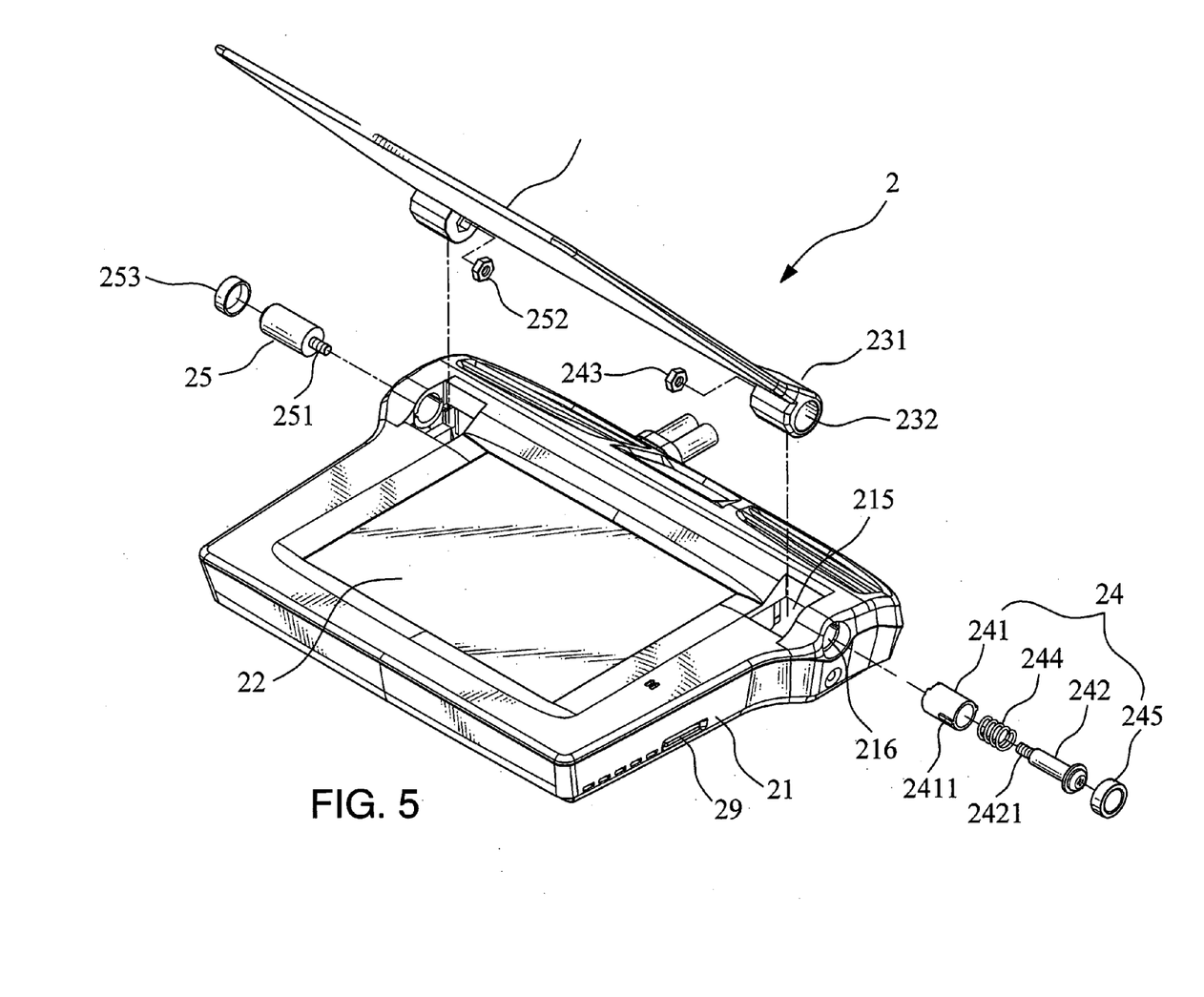
FIG. 5 is a three-dimensional exploded diagram (2) of the present invention.
Figure 6:
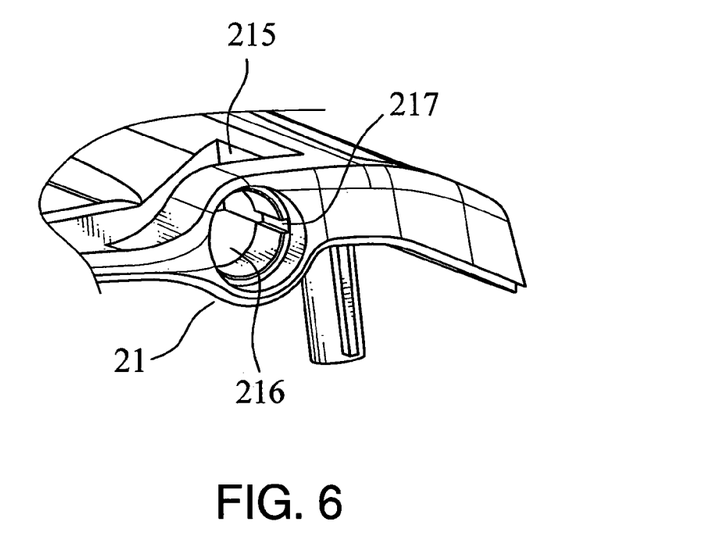
FIG. 6 is a partial three-dimensional diagram of the body of the present invention.
Figure 7:
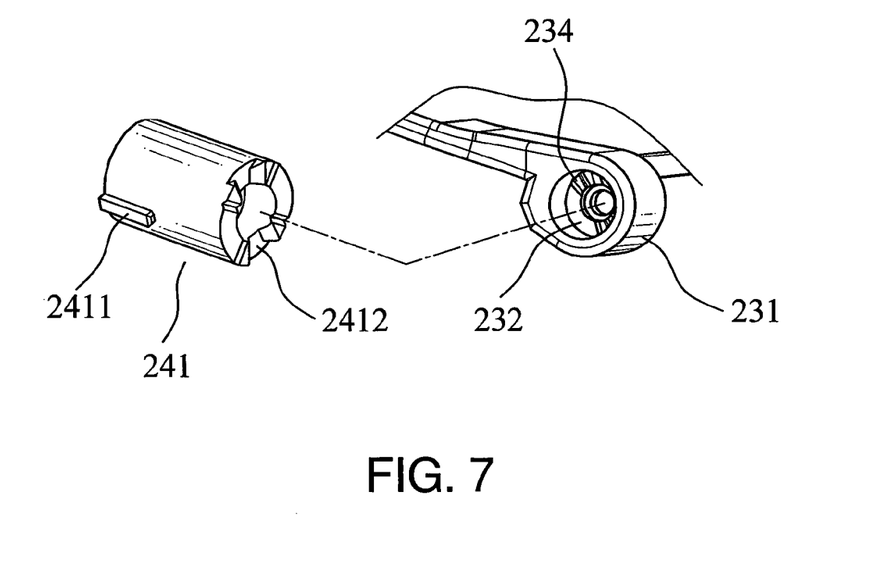
FIG. 7 is a partial three-dimensional diagram of the lid of the present invention.

A traditional display 11, as shown in FIG. 1, is a sample using a shaft 12 as a rotation mechanism. There are many similar structures with various functions, and these structures commonly have the problems of complex components and high cost. The usage of these structures is mostly static operating that the problem of display being shaken may not needed to be concerned, and this is very different from head-up displays. The rotating shaft mechanism used in clamshell head-up display may be conform to the requirements of maintaining the display static without being shaken during driving, and this is a technical-bottleneck of the rotating shaft mechanism of 3C products that not easy to overcome.

SUMMARY OF THE INVENTION

In view of the conventional drawbacks, a clamshell reflective service is utilized by the inventor of the present invention, to provide the projection display of the information screen. The inventor also refers to the rotating shaft mechanisms used in the present 3C products for flipping simultaneously, and finally complete the clamshell car head-up display device of the present invention, namely, the object of the invention is to provide a car head-up display device capable to fix the clamshell flip angle, to thereby ensure that the information screen does not be shaken due to car driving.

To achieve the object, the first embodiment of the clamshell car head-up display device of the present invention includes:

a body, a containing space is set inside and a circuit board is set in the containing space, a displaying opening is set on an upper surface of the body, a first groove and a first recess are set on two sides of the body respectively, a sliding slot is set inside the first recess;

a display module, which is electrically connected to the circuit board and set on the displaying opening, to receive display information output by the circuit board;

a lid, a shaft base and a second recess are respectively set on two ends of a lateral side of the lid, the shaft base is pivoted inside the first groove, a reflector plate is set on an inner side of the lid for the display module to project the display information on it, a bump is set in the second recess;

a shaft group, which is pivoted inside the first recess on one side of the body and the second recess on one side of the lid, a slide block is set on its outside, the slide block is slipped on the sliding slot of the first recess, at least a second groove is set on its bottom for the bump of the second recess to wedge;

a shaft, which is pivoted in the first recess on another side of the body and a second recess on another side of the lid.

The above shaft group includes a sleeve, a pivoted bolt, a nut and a spring, the spring is set on the pivoted bolt and placed inside the sleeve, the nut is fastened on an end of the pivoted bolt.

The clamshell car head-up display device of the present invention further includes an anti-glare filter, which is set above the display module.

The clamshell car head-up display device of the present invention further includes an optical sensing module, which is electrically connected to the circuit board to modulate the brightness of the display module.

The clamshell car head-up display device of the present invention, wherein the lid is a transparent lid, the reflector plate of the lid is a coating or a film.

The clamshell car head-up display device of the present invention further includes a speaker module, which is electrically connected to the circuit board, and audio messages are provided to inform drivers through the speaker module.

The second embodiment of the clamshell car head-up display device of the present invention includes:

a body, a containing space is set inside and a circuit board is set in the containing space, a displaying opening is set on an upper surface of the body, a first groove and a first recess are set on two sides of the body respectively, a sliding slot is set inside the first recess;

a display module, which is electrically connected to the circuit board and set on the displaying opening, to receive display information output by the circuit board;

a lid, a shaft base and a second recess are respectively set on two ends of a lateral side of the lid, the shaft base is pivoted inside the first groove, a reflector plate is set on an inner side of the lid for the display module to project the display information on it, a bump is set in the second recess;

two shaft groups, which are pivoted inside the first recess on one side of the body and the second recess on one side of the lid, a slide block is set on its outside, the slide block is slipped on the sliding slot of the first recess, at least a second groove is set on its bottom for the bump of the second recess to wedge.

The above shaft group includes a sleeve, a pivoted bolt, a nut and a spring, the spring is set on the pivoted bolt and placed inside the sleeve, the nut is fastened on an end of the pivoted bolt.

The clamshell car head-up display device of the present invention further includes an anti-glare filter, which is set above the display module.

The clamshell car head-up display device of the present invention further includes an optical sensing module, which is electrically connected to the circuit board to modulate the brightness of the display module.

The clamshell car head-up display device of the present invention, wherein the lid is a transparent lid, the reflector plate of the lid is a coating or a film.

The clamshell car head-up display device of the present invention further includes a speaker module, which is electrically connected to the circuit board, and audio messages are provided to inform drivers through the speaker module.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

As shown in FIG. 2 to FIG. 7, the first embodiment of the clamshell car head-up display device 2 of the present invention includes a body 21, a display module 22, a lid 23, a shaft group 24 and a shaft 25.

The body 21, which is consisted of an upper seat 21B and a bottom base 21A, a containing space 211 is set inside the body 21 and a circuit board 212 having a microprocessor 213 is placed inside, the microprocessor 213 is used to perform related information processing, and connected to a global positioning system (GPS) 3 for obtaining the location of the car, or connected to a satellite navigation device 4 for obtaining related messages of the satellite navigation device 4, such as car speed, road limit speed, navigation direction indication; or connected to a car system for obtaining related messages of the car, such as car tire pressure, car battery volume, car doors are closed or not, rear door mold is closed or not, car speed, a displaying opening 214 is set on an upper surface of the body 21, a first groove 215 and a first recess 216 are set on two sides of the body 21 respectively, a sliding slot 217 is set inside the first recess 216.

The display module 22, which is electrically connected to the circuit board 212 and set on the displaying opening 214, to receive display information output by the circuit board 212, the display information may be driving messages, such as car tire pressure, car battery volume, car doors are closed or not, rear door mold is closed or not, car speed, road limit speed, navigation direction indication.

The lid 23, which is a transparent lid, a shaft base 231 and a second recess 232 are respectively set on two ends of a lateral side of the lid 23, the shaft base 231 is pivoted inside the first groove 215 on two sides of the body 21, a reflector plate 233, which is a coating or a film, and may also be a heat insulation paper, a sun-shading paper, is set on an inner side of the lid 23 for the display module 22 to project the display information on the reflector plate 233 of the lid 23 for achieving the effect of reminding drivers, at least a bump 234 is set in the second recess 232.

The shaft group 24, which is pivoted inside the first recess 216 on one side of the body 21 and the second recess 232 on one side of the lid 23, the shaft group 24 includes a sleeve 241, a pivoted bolt 242, a nut 243 and a spring 244, the spring 244 is set on the pivoted bolt 242 and placed inside the sleeve 241, the nut 243 is fastened to a first threaded section 2421 on an end of the pivoted bolt 242, a slide block 2411 is set on an outside of the sleeve 241, the slide block 2411 is slipped on the sliding slot 217 of the first recess 216, the sleeve 241 may be moved laterally due to wedging with the sliding slot 217 and the elasticity of the spring 244, at least a second groove 2412 is set on a bottom of the sleeve 241 for the bump 234 of the second recess 232 to wedge, to fix the flip angle of the lid 23 when being lifted, to thereby avoid being shaken due to driving (please refer to FIG. 2 and FIG. 9), the shaft group 24 further includes a shaft liner 245 for protecting the shaft group 24.

The shaft 25 is pivoted in the first recess 216 on another side of the body 21 and a second recess 232 on another side of the lid 23, a second threaded section 251 is set on one end of the shaft 25 for a nut 252 to fasten, the shaft 25 further includes a shaft liner 253 to protect the shaft 25.

The clamshell car head-up display device 2 of the present invention further includes an anti-glare filter 26, which is set above the display module 22, and is provided to avoid reflection of car windshield caused by leaky light.

The clamshell car head-up display device 2 of the present invention further includes an optical sensing module 28. The optical sensing module 28 electrically connected to the circuit board 212 is provided to modulate the brightness of the display module 22 according to the measured light intensity, for drivers to see messages on display screen clearly.

The above clamshell car head-up display device 2 of the present invention further includes a speaker module 27, which is set in the rear part of the body 21 and electrically connected to the circuit board 212, and audio messages are provided to inform drivers through the speaker module 27; the clamshell car head-up display device 2 further includes a microphone 271, which is electrically connected to the circuit board 212, is used to receive driver's or other audio messages.

The clamshell car head-up display device 2 further includes a memory card slot 29, which is electrically connected to the circuit board 212, the memory card slot 29 is set in the body 21 for inserting a memory card.

As shown in FIGS. 2, 3, 4, 6, 7, 12, the second embodiment of the clamshell car head-up display device 2 of the present invention includes a body 21, a display module 22, a lid 23 and two shaft groups 24.

The body 21, which is consisted of an upper seat 21B and a bottom base 21A, a containing space 211 is set inside the body 21 and a circuit board 212 having a microprocessor 213 is placed inside, the microprocessor 213 is used to perform related information processing, and connected to a global positioning system (GPS) 3 for obtaining the location of the car, or connected to a satellite navigation device 4 for obtaining related messages of the satellite navigation device 4, such as car speed, road limit speed, navigation direction indication; or connected to a car system for obtaining related messages of the car, such as car tire pressure, car battery volume, car doors are closed or not, rear door mold is closed or not, car speed, a displaying opening 214 is set on an upper surface of the body 21, a first groove 215 and a first recess 216 are set on two sides of the body 21 respectively, a sliding slot 217 is set inside the first recess 216.

The display module 22, which is electrically connected to the circuit board 212 and set on the displaying opening 214, to receive display information output by the circuit board 212, the screen information may be driving messages, such as car tire pressure, car battery volume, car doors are closed or not, rear door mold is closed or not, car speed, road limit speed, navigation direction indication.

The lid 23, which is a transparent lid, a shaft base 231 and a second recess 232 are respectively set on two ends of a lateral side of the lid 23, the shaft base 231 is pivoted inside the first groove 215 on two sides of the body 21, a reflector plate 233, which is a coating or a film, and may also be a heat insulation paper, a sun-shading paper, is set on an inner side of the lid 23 for the display module 22 to project the display information on the reflector plate 233 of the lid 23 for achieving the effect of reminding drivers, at least a bump 234 is set in the second recess 232.

Figure 12:
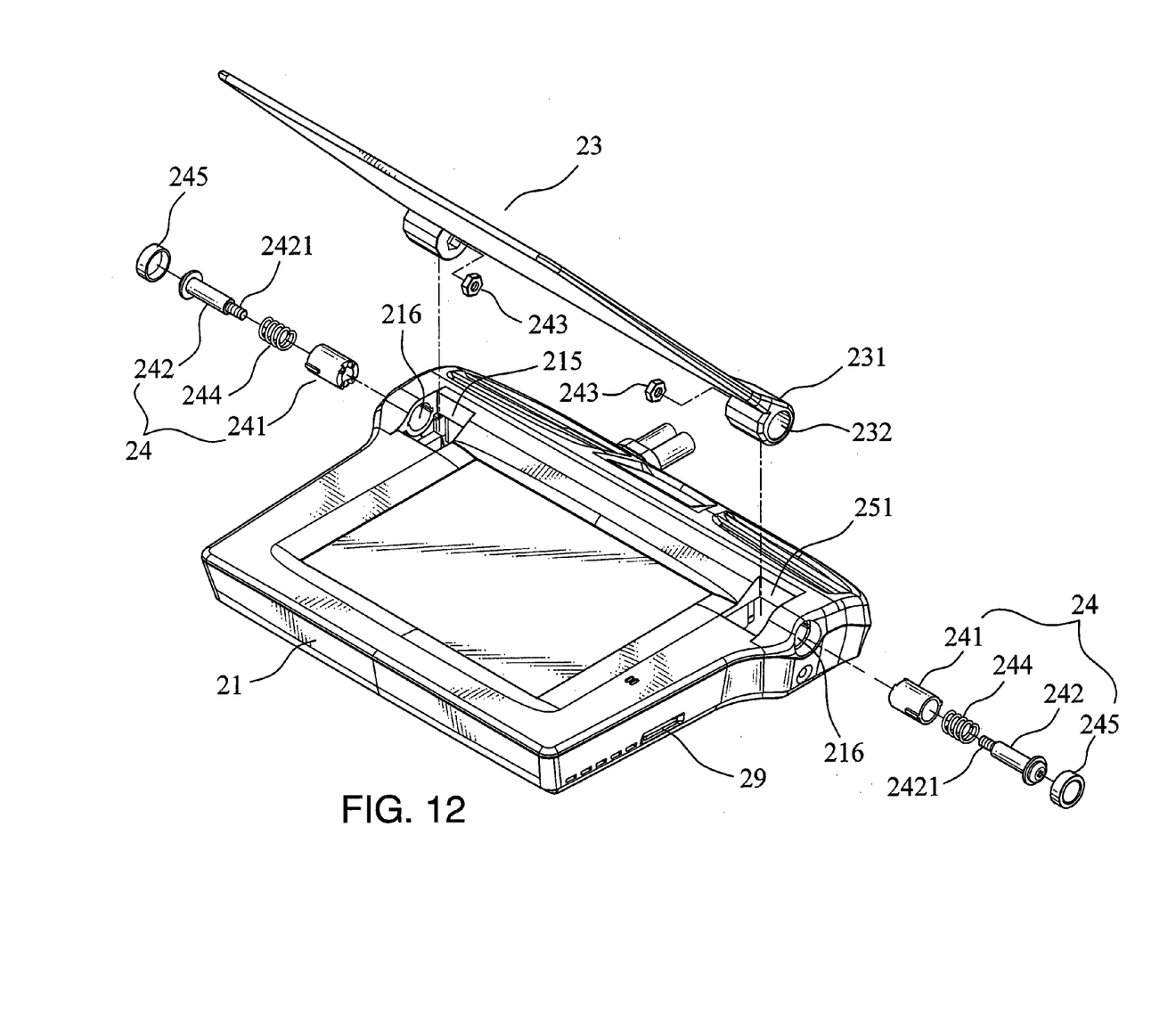
FIG. 12 is a three-dimensional exploded diagram of the second embodiment of the present invention.

The two shaft groups 24, which are pivoted inside the first recess 216 on one side of the body 21 and the second recess 232 on one side of the lid 23, the shaft group 24 includes a sleeve 241, a pivoted bolt 242, a nut 243 and a spring 244, the spring 244 is set on the pivoted bolt 242 and placed inside the sleeve 241, the nut 243 is fastened to a first threaded section 2421 on an end of the pivoted bolt 242, a slide block 2411 is set on an outside of the sleeve 241, the slide block 2411 is slipped on the sliding slot 217 of the first recess 216, the sleeve 241 may be moved laterally due to wedging with the sliding slot 217 and the elasticity of the spring 244, at least a second groove 2412 is set on a bottom of the sleeve 241 for the bump 234 of the second recess 232 to wedge, to fix the flip angle of the lid 23 when being lifted, to thereby avoid being shaken due to driving (please refer to FIG. 2 and FIG. 9), the shaft group further includes a shaft liner 245 for protecting the shaft group 24.

The above clamshell car head-up display device 2 of the present invention further includes an anti-glare filter 26, which is set above the display module 22, and is provided to avoid reflection of car windshield caused by leaky light.

The clamshell car head-up display device 2 of the present invention further includes an optical sensing module 28. The optical sensing module 28 electrically connected to the circuit board 212 is provided to modulate the brightness of the display module 22 according to the measured light intensity, for drivers to see messages on display screen clearly.

The above clamshell car head-up display device 2 of the present invention further includes a speaker module 27, which is set in the rear part of the body 21 and electrically connected to the circuit board 212, and audio messages are provided to inform drivers through the speaker module 27; the clamshell car head-up display device 2 further includes a microphone 271, which is electrically connected to the circuit board 212, is used to receive driver's or other audio messages.

The clamshell car head-up display device 2 further includes a memory card slot 29, which is electrically connected to the circuit board 212, the memory card slot 29 is set in the body 21 for inserting a memory card.

Figure 8:
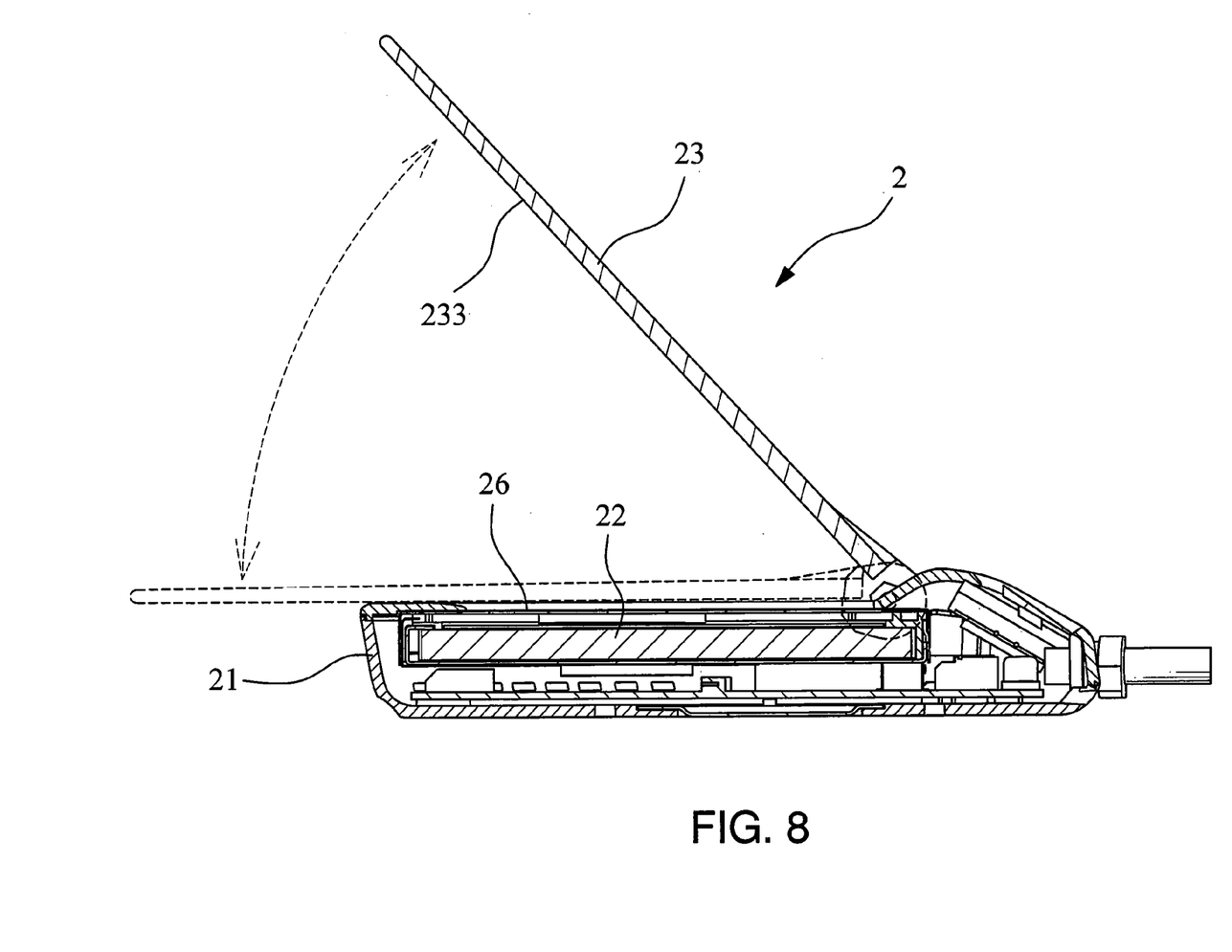
FIG. 8 is an action diagram of lifting the lid of the present invention.
Figure 9:
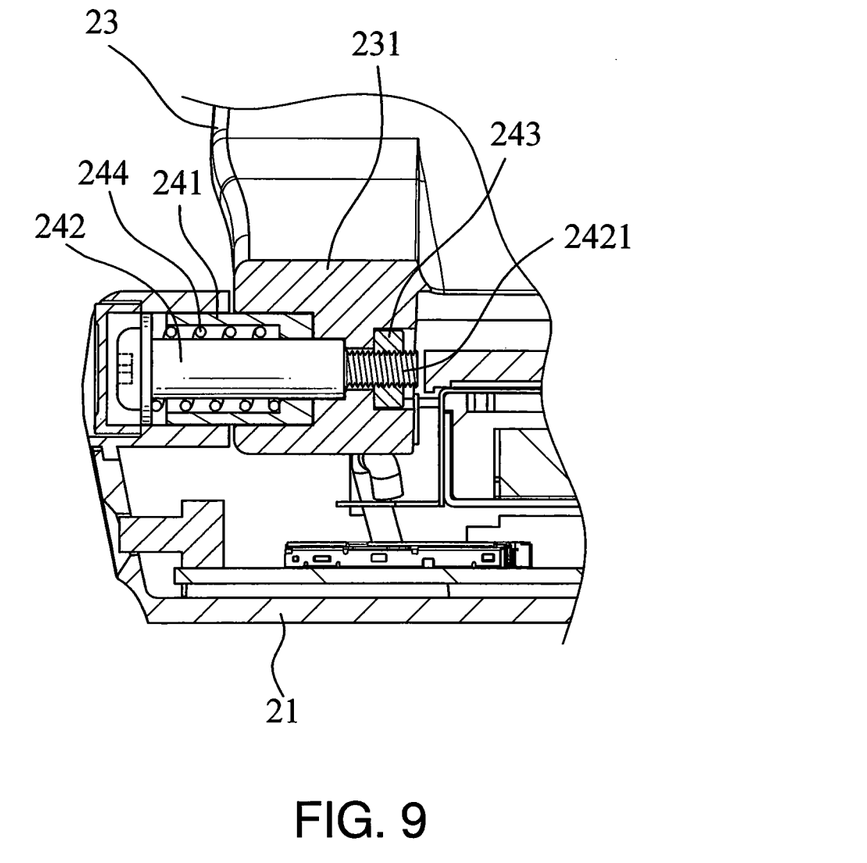
FIG. 9 is a cross-section diagram of the flip state of the shaft group of the present invention.
Figure 10:
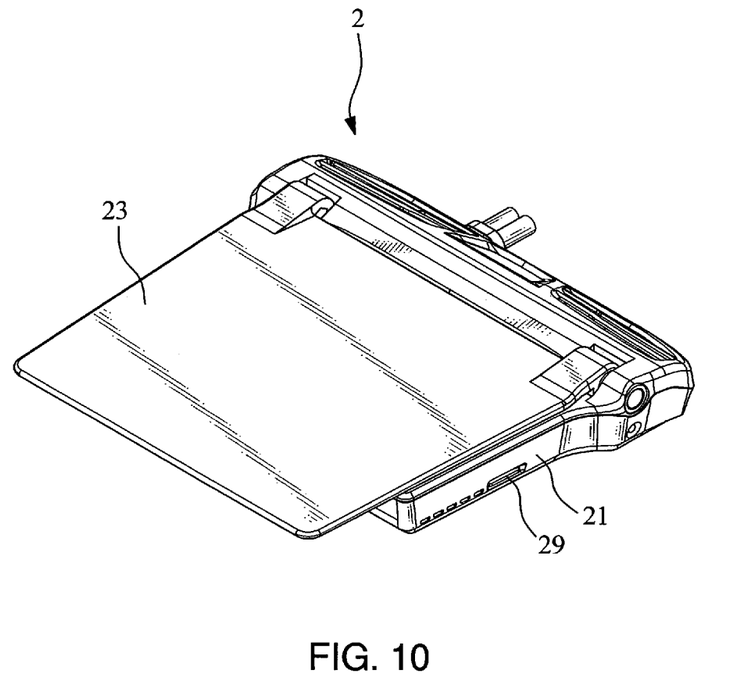
FIG. 10 is a three-dimensional diagram of the lid closed of the present invention.
Figure 11:
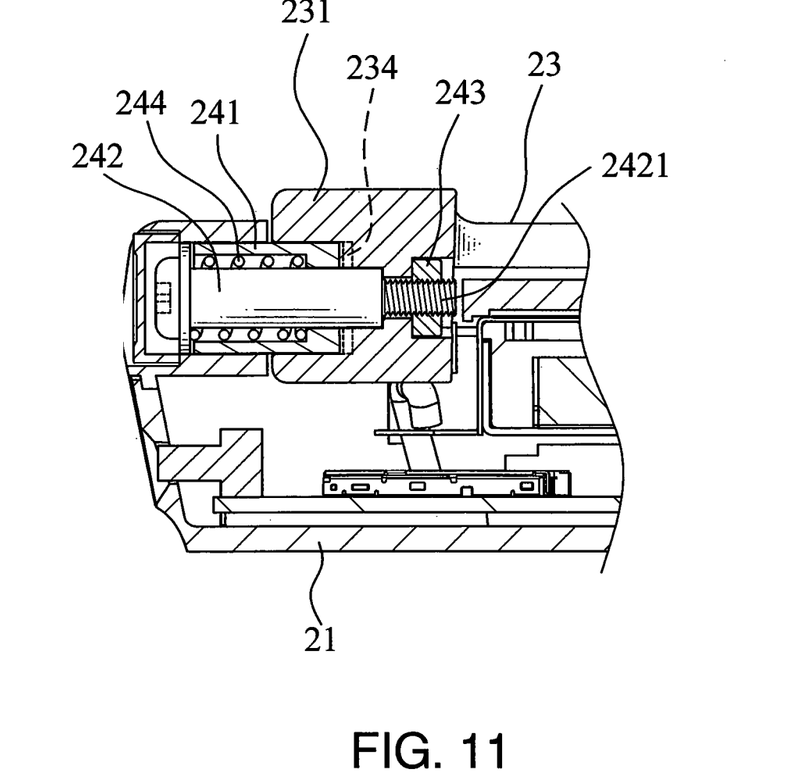
FIG. 11 is a cross-section diagram of the closed state of the shaft group of the present invention.

By the composition of above components, in the first and second embodiments of the present invention, when a driver wants to see driving information (as shown in FIGS. 8 and 9), he only needs to flip up the lid 23 to position. At this time, the slide block 2411 of the sleeve 241 is wedged in the sliding slot 217 of the first recess 216 and moves laterally due to elasticity of the spring 244, and the second groove 2412 on the bottom of the sleeve 241 is forced to be wedged to the bump 234 of the second recess 232. The flip angle of the lid 23 may be fixed when it is flipped, so that the display information projected on the reflector plate 233 in the inner surface of the lid 23 may not be shaken due to driving. Besides, when a driver does not need to see driving information (as shown in FIGS. 10, 11), he only needs to flip down and close the lid 23. At this time, the slide block 2411 of the sleeve 241 laterally returns and compresses the spring 244, the second groove 2412 of the sleeve 241 is departed from the bump 234 of the second recess 232 without the elasticity, and the lid 23 may be flipped down and closed.

I claim:
1. A clamshell car head-up display device comprising:
a body, a containing space is set inside the body and a circuit board is set in the containing space, a displaying opening is set on an upper surface of the body, a first groove and a first recess are set on two sides of the body respectively, a sliding slot is set inside the first recess;
a display module, which is electrically connected to the circuit board and set on the displaying opening, to receive display information output by the circuit board;
a lid, a shaft base and a second recess are respectively set on two ends of a lateral side of the lid, the shaft base is pivoted inside the first groove, a reflector plate is set on an inner side of the lid for the display module projecting the display information on it, a bump is set in the second recess;
a shaft group, which is pivoted inside the first recess on one side of the body and the second recess on one side of the lid, the shaft group has a sleeve, a slide block is located on an exterior of the shaft group, the slide block is inserted into the sliding slot of the first recess, at least one second groove is located on a bottom of the sleeve, the at least one second groove selectively engaging the bump of the second recess;
a shaft, which is pivoted in the first recess on another side of the body and a second recess on another side of the lid;
wherein the lid is moveable between an open position and a closed position, when the lid is located in the open position, a spring presses the slide block of the sleeve into the first recess and the slide block moves laterally in the sliding slot of the first recess, and the bump of the second recess is located in the second groove located on the end of the sleeve securing the reflector plate of the lid at a predetermined angle, and, when the lid is located in the closed position, the slide block of the sleeve moves laterally outwardly from the first recess compressing the spring, the bump of the second recess is separated from the second groove of the sleeve.

2. The clamshell car head-up display device as claimed in claim 1, further includes an anti-glare filter, which is set above the display module.

3. The clamshell car head-up display device as claimed in claim 1, further includes an optical sensing module, which is electrically connected to the circuit board to modulate the brightness of the display module.

4. The clamshell car head-up display device as claimed in claim 1, wherein the lid is a transparent lid, the reflector plate of the lid is a coating or a film.

5. The clamshell car head-up display device as claimed in claim 1, further includes a speaker module, which is electrically connected to the circuit board, and audio messages are provided to inform drivers through the speaker module.

6. The clamshell car head-up display device as claimed in claim 1, wherein the shaft group includes a pivoted bolt and a nut, the spring is set on the pivoted bolt and placed inside the sleeve, the nut is fastened on an end of the pivoted bolt.

7. A clamshell car head-up display device comprising:
- a body, a containing space is set inside and a circuit board is set in the containing space, a displaying opening is set on an upper surface of the body, a first groove and a first recess are set on two sides of the body respectively, a sliding slot is set inside the first recess;
- a display module, which is electrically connected to the circuit board and set on the displaying opening, to receive display information output by the circuit board;
- a cover, a shaft base and a second recess are respectively set on two ends of a lateral side of the cover, the shaft base is pivoted inside the first groove, a reflector plate is set on an inner side of the cover for the display module to project the display information on it, a bump is set in the second recess;
- two shaft groups, which are pivoted inside the first recess on one side of the body and the second recess on one side of the lid, each shaft group of the two shaft groups has a sleeve, a slide block is located on an exterior of the shaft group, the slide block is inserted into the sliding slot of the first recess, at least one second groove is located on a bottom of the sleeve, the at least one second groove selectively engaging the bump of the second recess;
- wherein the cover is moveable between an open position and a closed position, when the cover is located in the open position, a spring presses the slide block of the sleeve into the first recess and the slide block moves laterally in the sliding slot of the first recess, and the bump of the second recess is located in the second groove located on the end of the sleeve securing the reflector plate of the lid at a predetermined angle, and, when the cover is located in the closed position, the slide block of the sleeve moves laterally outwardly from the first recess compressing the spring, the bump of the second recess is separated from the second groove of the sleeve.

8. The clamshell car head-up display device as claimed in claim 7, further includes an anti-glare filter, which is set above the display module.

9. The clamshell car head-up display device as claimed in claim 7, further includes an optical sensing module, which is electrically connected to the circuit board to modulate the brighten ss of the display module.

10. The clamshell car head-up display device as claimed in claim 7, wherein the lid is a transparent lid, the reflector plate of the lid is a coating or a film.

11. The clamshell car head-up display device as claimed in claim 7, further includes a speaker module, which is electrically connected to the circuit board, and audio messages are provided to inform drivers through the speaker module.

12. The clamshell car head-up display device as claimed in claim 7, wherein the shaft group includes a pivoted bolt and a nut, the spring is set on the pivoted bolt and placed inside the sleeve, the nut is fastened on an end of the pivoted bolt.

* * * * *